(12) United States Patent
Kleverman et al.

(10) Patent No.: US 7,942,538 B2
(45) Date of Patent: May 17, 2011

(54) INFORMATION PRESENTING DEVICE

(75) Inventors: Mats Kleverman, Helsingborg (SE);
Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 337 days.

(21) Appl. No.: 12/090,475

(22) PCT Filed: Oct. 12, 2006

(86) PCT No.: PCT/EP2006/067343
§ 371 (c)(1),
(2), (4) Date: Apr. 25, 2008

(87) PCT Pub. No.: WO2007/045598
PCT Pub. Date: Apr. 26, 2007

(65) Prior Publication Data
US 2008/0239696 A1    Oct. 2, 2008

Related U.S. Application Data

(60) Provisional application No. 60/730,461, filed on Oct. 26, 2005.

(30) Foreign Application Priority Data

Oct. 17, 2005    (EP) .................................... 05022557

(51) Int. Cl.
*H04M 1/22*    (2006.01)

(52) U.S. Cl. ............................. 362/24; 362/88; 362/293

(58) Field of Classification Search ................. 362/1, 24, 362/84, 85, 86, 88, 97.2, 97.3, 293, 351
See application file for complete search history.

(56) References Cited

U.S. PATENT DOCUMENTS

| 6,595,669 B2 * | 7/2003 | Kreutzer et al. ............... 362/293 |
| 7,396,147 B2 * | 7/2008 | Munro ........................... 362/351 |

FOREIGN PATENT DOCUMENTS

| EP | 0 782 307 A | 7/1997 |
| EP | 1 231 757 A | 8/2002 |
| EP | 1 319 972 A | 6/2003 |

OTHER PUBLICATIONS

International Search Report with Written Opinion in PCT Application No. PCT/EP2006/067343, dated Feb. 23, 2007, 8 pages.

* cited by examiner

*Primary Examiner* — Y My Quach Lee
(74) *Attorney, Agent, or Firm* — Harrity & Harrity, LLP

(57) ABSTRACT

The invention is directed towards an information presenting device and a portable electronic device including such an information presenting device. The information presenting device (16) comprises a first information layer (18) having a first information presentation structure (20) of photo chromatic material changing appearance when irradiated by light (28) of a specific wavelength, a second information layer (22) having a second information presentation structure (24), and a first light source (26) illuminating the second information layer for presenting the second information presentation structure, wherein the first information layer is of a material that is transparent for light emanating at least from the first light source when the first layer is not exposed to light of said specific wavelength.

13 Claims, 3 Drawing Sheets

INFORMATION PRESENTING DEVICE

RELATED APPLICATIONS

This application is the national phase under 35 U.S.C. §371 of PCT International Application No. PCT/EP2006/067343 which has an International filing date of Oct. 12, 2006, which designated the United States of America and which claims priority of European Patent Application Number 05022557.2 filed Oct. 17, 2005, and also claims priority under 35 U.S.C. §119 of U.S. Provisional Application Ser. No. 60/730,461 filed Oct. 26, 2005, which are incorporated by reference herein.

TECHNICAL FIELD OF THE INVENTION

The present invention relates to the field of portable electronic devices and more particularly to the provision of an information presenting device in relation to portable electronic devices as well as a portable electronic device including such an information presenting device.

DESCRIPTION OF RELATED ART

In portable electronic devices such as portable communication devices like cellular phones, there is a widespread use of light sources for displaying information to the user of the device. A light source is typically used in relation to the displaying of information provided on keys of a keypad or information provided on a display. In the case of keys, the light source then illuminates an information layer which shows a symbol or icon related to the key. However, because of the portability of the device it is frequently used outdoors where a lot of ambient light like sunlight falls onto the information presenting surface of the key. When this happens the illuminated information layer is in many cases not possible to perceive properly despite the illumination from the light source. If there are many sets of different information structures these structures may also be superimposed onto each other making it hard to perceive the structure to be presented. There is thus a need for being able to perceive information also when there is much ambient light.

At the same time photo chromatic materials have appeared that change appearance because of light that falls onto them with a wavelength that actuates the chromatic layer, where these materials are known to be used in relation to different objects like sunglasses and textiles.

US 2005/0156048 describes the use of such material for safety measures on identity documents like ID cards and credit cards. The material is here used for presenting a watermark.

There is therefore a need for providing an information presenting device that uses light sources for presenting information that may present information also when there is a lot of ambient light at least at a specific wavelength.

SUMMARY OF THE INVENTION

The present invention is directed towards solving the problem of providing an information presenting device that uses light sources for presenting information that may present information also when there is a lot of ambient light at least at a specific wavelength.

One object of the present invention is thus to provide an information presenting device that uses light sources for presenting information that may present information also when there is a lot of ambient light at least at a specific wavelength.

According to a first aspect of the present invention, this object is achieved by an information presenting device comprising:
 a first information layer comprising a first information presentation structure of photo chromatic material changing appearance when irradiated by light of a specific first wavelength, wherein the first layer is in an activated state when the photo chromatic material has changed appearance and is otherwise in a normal state,
 a second information layer comprising a second information presentation structure, and
 a first light source illuminating the second information layer for presenting the second information presentation structure,
 wherein the first information layer is of a material that is transparent for light emanating at least from the first light source when the first layer is in the normal state.

A second aspect of the present invention is directed towards an information presenting device including the features of the first aspect, wherein the second information layer is placed for presenting the second information presentation structure via the first information layer.

A third aspect of the present invention is directed towards an information presenting device including the features of the first aspect, wherein the first information presentation structure has changed colour when the first information layer is in the activated state.

A fourth aspect of the present invention is directed towards an information presenting device including the features of the first aspect, wherein the first information layer is transparent also for light of said first specific wavelength.

A fifth aspect of the present invention is directed towards an information presenting device including the features of the fourth aspect, further comprising a semi-reflective layer provided between the first and second information layer, which is transparent for light coming from the second information layer and reflective for light coming from the first information layer.

A sixth aspect of the present invention is directed towards an information presenting device including the features of the first aspect, wherein the first information layer is opaque for light having said specific first wavelength.

A seventh aspect of the present invention is directed towards an information presenting device including the features of the first aspect, further comprising a second light source for illuminating, with light including light having a specific wavelength, at least one information layer having an information presentation structure of photo chromatic material that changes appearance when irradiated by light having this specific wavelength.

An eighth aspect of the present invention is directed towards an information presenting device including the features of the seventh aspect, further comprising a third information presenting layer provided between the first and second information presenting layers having a third information presentation structure of photo chromatic material changing appearance when irradiated by light having a specific second wavelength, where said second light source is directed towards the third information presentation layer.

A ninth aspect of the present invention is directed towards an information presenting device including the features of the first aspect, being provided in at least one key arranged for entering information into a portable electronic device.

A tenth aspect of the present invention is directed towards an information presenting device including the features of the first aspect, wherein it is a display and preferably a liquid crystal display.

Another object of the present invention is to provide a portable electronic device having an information presenting device that uses light sources for presenting information that may present information also when there is a lot of ambient light.

According to an eleventh aspect of the present invention, this object is achieved by a portable electronic device comprising an information presenting device having:
  a first information layer comprising a first information presentation structure of photo chromatic material changing appearance when irradiated by light of a specific first wavelength, wherein the first layer is in an activated state when the photo chromatic material has changed appearance and is otherwise in a normal state,
  a second information layer comprising a second information presentation structure, and
  a first light source illuminating the second information layer for presenting the second information presentation structure,
  wherein the first information layer is of a material that is transparent for light emanating at least from the first light source when the first layer is in the normal state.

A twelfth aspect of the present invention is directed towards a portable electronic device including the features of the eleventh aspect, in which it is a portable communication device.

A thirteenth aspect of the present invention is directed towards a portable electronic device includes the features of the twelfth aspect, in which it is a cellular phone.

The invention has the following advantages. If the first and second information presentation structures are the same it is possible to show symbols presented also in high ambient light conditions when there is light having said specific wavelength, which simplifies the use of the device outdoors. It is furthermore possible that the information presented in the first and second information structures differ from each other. This can be used for providing different sets of functions associated with the information presenting device for different light conditions. The invention further allows the provision of the information in the first information layer without the use of extra power. The invention is also simple and cheap to implement since a limited number of elements are needed. The invention according to the fifth and sixth aspect has the further advantage of allowing the presenting of additional information also when there is limited ambient light like sunlight.

The expression "the first layer is in the normal state" is intended to cover the situation where this layer may be irradiated by light having the specific first wavelength but where the light of this wavelength has an intensity that is insufficient for at least the information presentation structure of the layer to change appearance.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable electronic device according to the present invention will now be described in relation to a cellular phone, which is a preferred variation of such a device. The portable electronic device may be a portable communication device of some other type, like a cordless phone, a communication module, a PDA or any other type of portable device communicating with radio waves. It can also be a gaming machine a notepad or any other type of portable electronic device.

Figure 1:
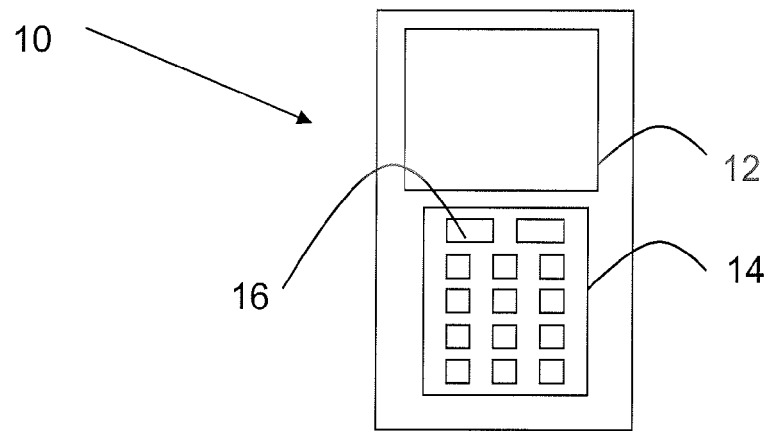
FIG. 1 schematically shows a front view of a portable electronic device in the form of a cellular phone, FIG. 2 schematically shows a first embodiment of an information presenting device for a key of the portable electronic device of FIG. 1, FIG. 3 schematically shows the functioning of the device according to the first embodiment at low ambient light conditions, FIG. 4 schematically shows the functioning of the device according to the first embodiment at high ambient light conditions, FIG. 5 schematically shows a second embodiment of an information presenting device for a key of the portable electronic device of FIG. 1, FIG. 6 schematically shows the functioning of the device according to the second embodiment at low ambient light conditions, FIG. 7 schematically shows the functioning of the device according to the second embodiment at high ambient light conditions, FIG. 8 schematically shows a third embodiment of an information presenting device for a key of the portable electronic device of FIG. 1, and FIG. 9 schematically shows a fourth embodiment of an information presenting device for a key of the portable electronic device of FIG. 1.

FIG. 1 schematically shows a front view of a phone according to the invention. The phone 10 includes a display 12 and a keypad 14, including a key 16, which key will be used for the explanation of the present invention. As is customary the keypad includes several more keys, and the invention may be practised on some or all of them. It is furthermore possible to apply the teaching of the present invention also on other types of user input units like on navigation units such as joysticks, and other types of buttons as well as on the display, which then may be a liquid crystal display. It is furthermore possible to apply the teachings of the present invention for decorative purposes of the portable electronic device.

Figure 2:
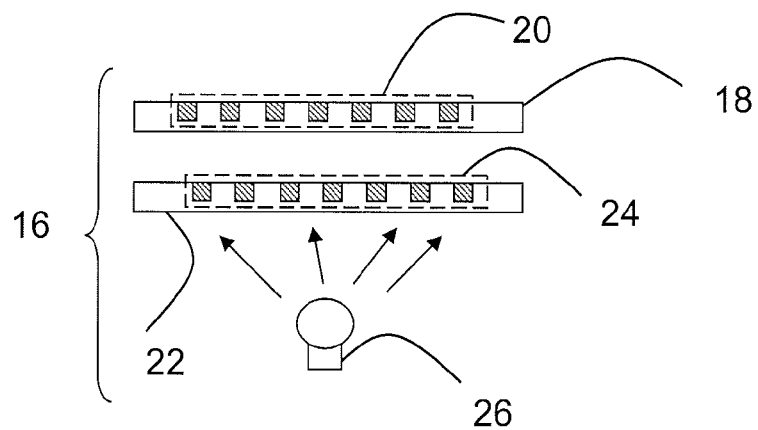

FIG. 2 schematically shows a side view of the structure of a first embodiment of an information presenting device 16 according to the invention. The device includes an outer first information layer 18, which may be of a plastic material. In the first information layer 18 there is provided a first information presentation structure 20 which is of a photo chromatic material that changes appearance when being irradiated by light of a specific first wavelength. The area occupied by this structure is schematically shown as a dashed box. The structure 20 may be provided as discrete dots in order to be in the form of pixels or may be of one or more contiguous shapes for defining a visual symbol or icon. The pixels may furthermore also together form a visual symbol or icon. The first structure may be provided through providing a photo chromatic ink onto the plastic material. The symbol is here indicated by a number of boxes filled with diagonal lines that are provided in the box 20. It is furthermore possible that the whole first information layer is of a photo chromatic material that can change appearance when being irradiated by light having the first wavelength. Then the structure 20 may provide one colour or nuance and the rest of the layer another colour or nuance. Below the first information layer 18 there is provided a second information layer 22 which is provided with a second information presenting structure 24. This structure is indicated by a dashed box filled with smaller boxes filled with diagonal lines. This structure is in its simplest form fix and always present. It can be in the form of pixels or contiguous shapes provided in a plastic material. It may for instance be embossed into a plastic material. The colour of the structure 24 may contrast the colour of the rest of the material of the layer. However it can also be a nuance of the colour of the rest of the material. It is possible that the second information layer 22 is a liquid crystal layer, in which case it is possible to vary the shapes provided by this layer. However in some embodiments of the present invention it may always have some information for presenting as long as the portable electronic device is turned on. It may also have some information when the device is turned off, for instance when provided in a key. Below the second layer 22 there is provided a first light source 26, preferably in the form of a light emitting diode, which may use backlighting for illuminating the second information layer 22. It should here be realised that the second information layer 22 may extend throughout a keypad but be provided with means stopping light from one key from reaching a neighbouring key. The first light source 26 may furthermore be used for more than one key by the use of a panel guiding the light from the diode to each key to be lit.

It should be realised that the present invention is not limited to a key, a keypad or a touch input display, but can be used on any surface where information is to be presented.

In this first embodiment of the present invention the first information layer 18 is opaque for the ambient light including light having a specific first wavelength that activates the photo chromatic material but transparent for light emitted by the first light source 26. In operation the first light source 26 illuminates the second information layer 22 so that the second information presentation structure 24 will appear to a user looking at the key 16 through the first information layer 18.

Figure 3:
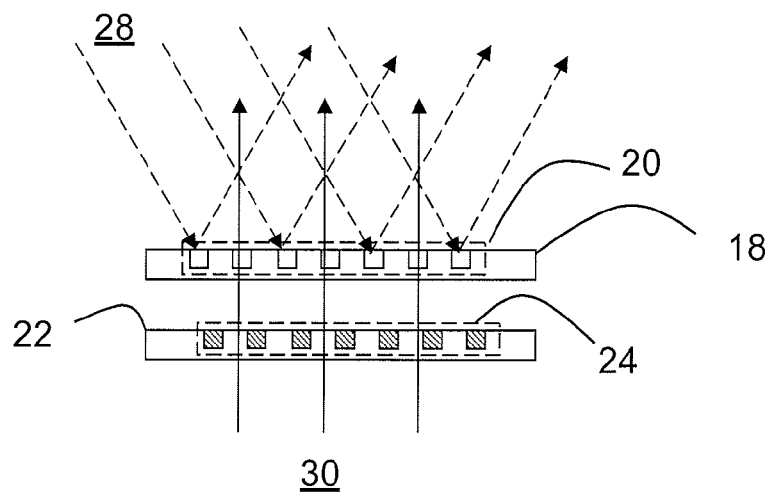
Figure 4:
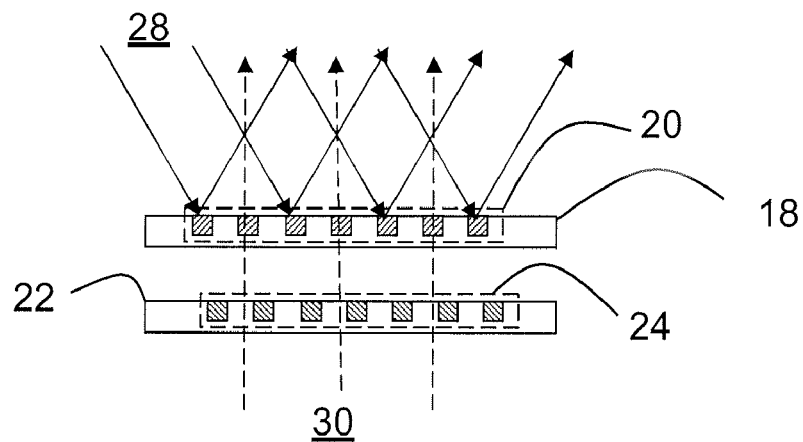

FIG. 3 shows a side view of the first 18 and second 22 information layers of the first embodiment when a low ambient light condition prevails with not enough light of said specific first wavelength for activating the photo chromatic material, while FIG. 4 shows a side view of the first and second information layers when a high ambient light condition prevails with enough light of said specific first wavelength for activating the photo chromatic material. A low ambient light condition typically prevails when the phone is used indoors or outdoors when there is no or small amounts of light having the activating wavelength as compared with the light emitted by the light source. A high ambient light condition basically occurs outdoors in daylight when there is a lot of sunlight including light having the activating wavelength irradiated towards the key 16. Then light emitted by the light source is basically shaded out by the sunlight, which results in that the information provided by second information layer 22 cannot be perceived by a user.

When the low ambient light condition exists the light 30 from the first light source dominates, which is indicated by solid arrows going upwards through the second and first information layers 22 and 18, whereas the ambient light 28, which is reflected by the first layer 18 is low, which is indicated by dashed arrows. Ambient light 28 is thus reflected off the first information layer 18, while the light 30 from the light source passes through the second and first information layers and thereby presents the information 24 to a user. The first information layer 18 is here opaque for the ambient light, i.e. it gets reflected. The intensity of the ambient light at the activating wavelength is here too low for the structure to change colour or become tinted, which is indicated by boxes lacking diagonal lines in the first information presentation structure 20.

Once the intensity of the ambient light having the activating wavelength is high enough, the ambient light 28 that hits the first structure 20 of the first information layer 18, makes the photo chromatic material therein change colour or become tinted so that now the first structure 20 is visible. At the same time the second structure 24 is not visible from above the first information layer 18 because of the high amount of reflected light 28 as compared by the emitted light 30 from the first light source. This different relationship of the ambient light 28 and the LED light 30 is indicated by solid arrows for the ambient light 28 and dashed arrows for the light 30 from the first light source. The activation of the structure in the first information layer is furthermore indicated by the boxes in the first structure being filled with diagonal lines.

When the photo chromatic material has changed appearance in this way when the intensity of the light having the activating wavelength is high enough, the first layer is here defined as being in an active state, and when the material has not changed shape, the first layer is defined as being in a normal state. Thus the activation of the photo chromatic material in the first structure 20 brings the first information layer 18 from a normal state into an activated state.

Figure 5:
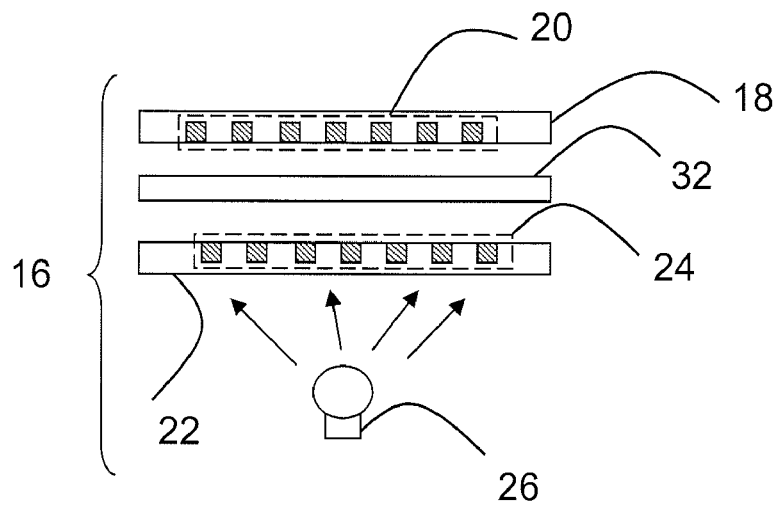

FIG. 5 shows a side view of the structure of a second embodiment of an information presenting device 16 according to the invention. Like in the first embodiment there is here a first 18 and second 22 information layer as well as a light source 26. However in this embodiment the first information layer 18 is transparent also for ambient light, i.e. the ambient light passes through the first information layer 18. For this reason there is provided a semi-transparent layer 32 between the two information layers. The semi-transparent layer is reflective for the light passing through the first information layer 18 but transparent for the light coming from the first light source 26 via the second information layer 22.

Figure 6:
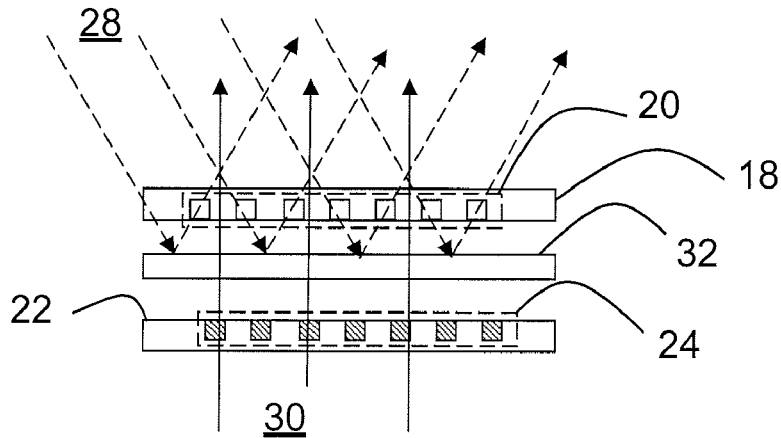
Figure 7:
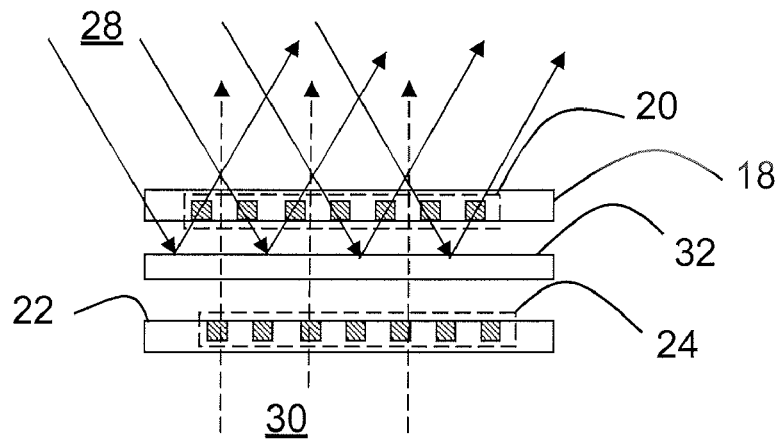

FIGS. 6 and 7 show side views of the first and second information layers of the second embodiment when a low ambient light condition and a high ambient light condition prevails. Here the ambient light 28 passes through the first information layer 18 and gets reflected off the reflective layer 32 and returns back through the first layer 18, while the light 30 from the first light source passes through both layers 22 and 18. When a low ambient light condition prevails, the first information structure 20 of the first information layer 18 does not change, i.e. it is invisible, while when the high ambient light condition prevails, i.e. the ambient light includes light having the activating wavelength with a high enough intensity, it changes colour or becomes tinted for being presented. In both cases the ambient light passes through the first information layer two times.

The invention according to both the first and second embodiments has a number of advantages. If the first and second information presentation structures are the same it is here possible to show the symbols presented also in high ambient light conditions, which simplifies the use of the device outdoors. The symbols can here for instance be the different activation buttons in relation to an MP3-player. It is furthermore possible that the information presented in the first and second information structures differ from each other. This can be used if different sets of functions associated with the key are to be used at different light conditions, where a low ambient light condition might be intended for office use and as high ambient light condition be intended for leisure use that is different than office use. It is furthermore possible that the first information structure is to be superposed onto the first information structure in order to modify it, for instance in order to provide a mystic or decorative effect of the second information structure.

Further advantages of the present invention is that it provides these effects without the use of extra power. It is furthermore simple and cheap to implement since a limited number of additional elements are needed.

Figure 8:
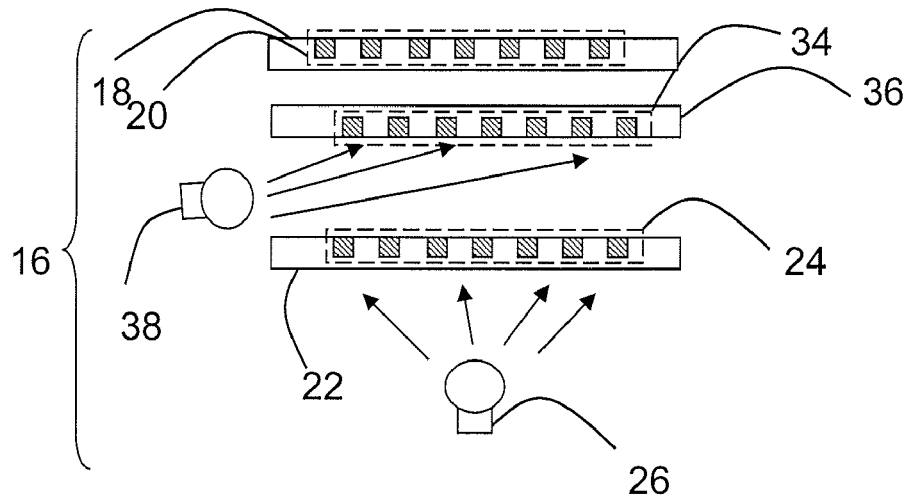

FIG. 8 shows a side view of a third embodiment of the device according to the present invention. Here there is provided a third information layer 36 having a third information presentation structure 38 of photo chromatic material. This third information layer 36 is provided between the first and second information layers 18 and 22 and may also be of a plastic material. Here the first information layer 18 is always transparent, while the third information layer 36 is opaque to ambient light if it includes a high enough intensity of light having a second specific wavelength that activates the third layer 36 and otherwise transparent. There is furthermore provided a second light source 38, which may be a UV light source, perhaps in the form of a UV emitting LED, which emits UV light onto the third information layer 34, where the UV light emitted includes light having the second wavelength with a high enough intensity that activates the third layer 36. However, the second light source is in no way limited to UV light sources, but may be any light source providing light of a wavelength that activates the third layer. According to a variation of this embodiment it is possible that also the third information layer is transparent. In this case the structure can include the semi-reflective layer between the third and second information layers. This third embodiment allows the provision of also the third information presentation structure to a user. This embodiment has the further advantage of presenting a third information structure to the user, which may be used for creating effects on identical information provided in the first and second layers. It can also be used for creating effects on the second information structure when there is no high ambient light condition prevailing. As an alternative it is possible to remove the second layer from the structure of FIG. 8 and have the third layer take over the function of the second layer in addition to the function it has in FIG. 8. It is also possible to remove the third layer, make the second light source emit light onto the second layer and have the second layer take over the function of the third layer in addition to its original function.

The third layer is in here, in the same way as the first layer, defined as being in an active state when the photo chromatic material has changed appearance because of suitable radiation, and when the material has not changed shape, it is in a normal state.

Figure 9:
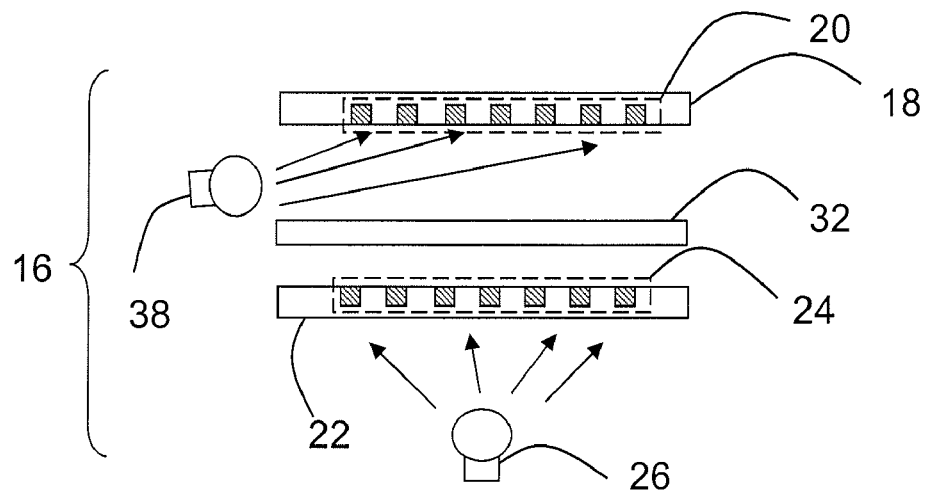

FIG. 9 shows a side view of a fourth embodiment of the device according to the present invention. Here the first information layer 18 is of the type that is transparent to all light, but it is combined with the second light source 38 and the semi-reflective layer 32. This allows the provision of the information of the first information layer also when it is dark. As an alternative to this embodiment it is furthermore possible to let the first information layer be opaque to light if it includes a high enough intensity of light having a wavelength that activates the photo chromatic material and omit the semi-reflective layer.

The third information layer may in both the third and fourth embodiment change appearance for the same wavelength as the first layer or for some other wavelength.

It should be realised that according to the present invention all information is to be presented to a user via the first information layer. In order to enable this, different layers may be provided on top of each other, side-by-side or have any other suitable relationship. However the actual placing of layers is not essential, as it is possible to obtain the desired effect through using light guides, mirrors and other optical elements. It is sufficient that the second and third information layers are placed in such a way that their information can be presented to a user via the first information layer.

The invention claimed is:

1. An information presenting device comprising:
    a first information layer including a first information presentation structure of photo chromatic material configured to be in an activated state based on incident light of a first wavelength, wherein, when in the activated state, the photo chromatic material is to present the first information presentation structure, and, when in a non-activated state, the first information presentation structure is not presented;
    a second information layer including a second information presentation structure disposed between the first information layer and a first light source; and
    the first light source to illuminate a surface of the second information layer, which is furthest from the first information layer, to present the second information presentation structure via the first information layer, wherein the first information layer is configured to be in the activated state when the first information layer is subjected to incident ambient light in excess of an amount of the incident ambient light that results in a user being unable to perceive information provided by the second information layer, and to be transparent to light of a second wavelength from the first light source when the first information layer is in the non-activated state.

2. The information presenting device of claim 1, wherein the first information presentation structure is a first color when the first information layer is in the activated state and a second color when the first information layer is in the non-activated state, wherein the first color differs from the second color.

3. The information presenting device of claim 1, wherein the first information layer is transparent to light of the first wavelength.

4. The information presenting device of claim 1, further comprising:
    a semi-reflective layer provided between the first information layer and the second information layer, the semi-reflective layer being transparent to light from the second information layer and reflective to light from the first information layer.

5. The information presenting device of claim 1, wherein the first information layer is opaque to light of the first wavelength.

6. The information presenting device of claim 1, further comprising:
    a second light source to illuminate, with light including light of the first wavelength, a third information layer, disposed between the first and second information layers, having an information presentation structure of photo chromatic material configured to change in appearance when irradiated by light of the first wavelength.

7. The information presenting device of claim 6, wherein the third information layer comprises:
    a third information presenting layer provided between the first and second information presenting layers, and
    where the third information layer includes:
        a third information presentation structure of photo chromatic material configured to change in appearance when irradiated by light of the second wavelength.

8. The information presenting device of claim 1, wherein the information presenting device resides in at least one input key in a portable electronic device.

9. The information presenting device of claim 1, wherein the information presenting device is a display.

10. The information presenting device of claim 9, wherein the second information layer comprises a liquid crystal display.

11. The information presenting device of claim 1, where the information presenting device comprises a portable electronic device.

12. The information presenting device of claim 1, wherein the information presenting device comprises a portable communication device.

13. The information presenting device of claim 1, wherein the information presenting device comprises a cellular phone.

* * * * *